United States Patent [19]

Lee

[11] 4,168,518
[45] Sep. 18, 1979

[54] CAPACITOR TRANSDUCER

[76] Inventor: Shih Y. Lee, Huckleberry Hill, Lincoln, Mass. 01773

[21] Appl. No.: 795,617

[22] Filed: May 10, 1977

[51] Int. Cl.² .............................................. H01G 7/00
[52] U.S. Cl. ...................................... 361/283; 73/724
[58] Field of Search ................... 73/724, 718; 361/283

[56] References Cited

U.S. PATENT DOCUMENTS

| | | | |
|---|---|---|---|
| 2,121,148 | 6/1938 | Hagen | 361/305 X |
| 2,164,638 | 7/1939 | Broeze | 361/283 X |
| 3,292,059 | 12/1966 | Woods | 361/283 |
| 3,308,357 | 3/1967 | Youngblood | 361/283 |
| 3,376,376 | 4/1968 | Smith | 174/505 X |
| 3,381,190 | 4/1968 | Hoogenboom | 361/283 |
| 3,715,638 | 2/1973 | Polye | 361/283 X |
| 3,858,097 | 12/1974 | Polye | 361/283 |
| 3,859,575 | 1/1975 | Lee | 361/283 |
| 4,064,549 | 12/1977 | Cretzler | 361/283 |

Primary Examiner—E. A. Goldberg
Attorney, Agent, or Firm—Kenway & Jenney

[57] ABSTRACT

A pressure sensing transducer and method of construction therefor. The device includes a pair of contoured dielectric plates joined together at their periphery and having a central portion with conductive film on opposed portions of the inner surfaces of the dielectric plates. One or more regions between the central portion and the periphery are of reduced thickness and pressure or force loading of the transducer causes deformation to occur in the dielectric elements to cause the spacing between the conductive films to vary in relationship to the applied pressure or force. The regions of reduced cross-section serve to reduce the stress setting up in the joint and to reduce the distortion of the central portion due to the application of pressure or force. The device further includes means for electrically coupling each of the conductive films to an associated terminal exterior of the transducer.

11 Claims, 11 Drawing Figures

CAPACITOR TRANSDUCER

BACKGROUND OF THE INVENTION

This invention relates to pressure or force sensing transducers, and more particularly to capacitive pressure or force sensing transducers.

There are many forms of pressure sensing transducers in the prior art which utilize capacitive sensors. As set forth in copending application Ser. No. 671,612, filed Mar. 29, 1976 U.S. Pat. No. 4,084,438 issued Apr. 18, 1978 the present inventor and Dennis K. Briefer, such transducers typically include a metal housing with a metallic diaphragm and are subject to the shortcomings set forth in that application. Capacitive pressure sensing transducers have also been made utilizing quartz or other dielectric materials for capsules with conductive films on the interior surfaces. West German patent application No. 2,021,479 and Polye, U.S. Pat. Nos. 3,715,638 and 3,858,097, are illustrative of such constructions. The operative portions of these prior art constructions are substantially flat and of substantially uniform thickness. With such uniform thickness there is a stress concentration in the region where the material is fused or cemented together and the deflection of the conductive surfaces of the transducer varies with the radial position of the deflected portion.

Accordingly, it is an object of the present invention to provide a capacitive pressure transducer whose deflection and maximum stress is controlled by the elastic properties and strength of the dielectric plate material rather than by the properties of the fusing or cementing material.

Another object is to provide a capacitive pressure transducer whose capacitive portions remain substantially parallel throughout its operating range.

A further object is to provide a capacitive pressure transducer with increased internal volume.

SUMMARY OF THE INVENTION

A pressure transducer according to the present invention includes a pair of dielectric elements, each having a central planar surface with a conducting film. A portion of at least one of said dielectric elements outward of said central planar surface is of reduced cross-section. Beyond said reduced cross-section the perimeter of the dielectric elements is fused or cemented together to form a hollow capsule having two parallel opposed inner conducting surfaces. When pressure is applied to said capsule, deformation occurs in the regions of reduced cross-section so that the spacing of the conducting surfaces varies in relationship to the applied pressure. The change in pressure produces a corresponding change in capacitance which may be sensed by leads connected to the conducting films or by capacitive coupling to external conducting films.

Each dielectric element of the transducer may be fabricated by grinding, or otherwise forming, one side of each of the dielectric elements to flat surfaces in the same plane. The portion of reduced cross-section will normally be formed by a recess in the material so that the dielectric material in the region of said reduced cross-section does not lie in the same plane of the flat surface of the element. The flat surfaces of the elements are then positioned together with the desired nominal spacing of the conductive films provided by small spacers around the perimeter of the adjoining portions of the dielectric elements. Material such as glass frit is applied in the perimeter and the temperature raised to the level at which the glass frit material will fuse the two dielectric elements together. The fused glass frit material will surround the small spacers so that they do not need to be removed. For applications in which a specific desired internal reference pressure, such as a vacuum, is desired, the fusing can take place in a vacuum oven.

BRIEF DESCRIPTION OF THE DRAWINGS

The invention and its various features may be more fully understood from the following description in conjunction with the accompanying drawings in which.

DESCRIPTION OF THE PREFERRED EMBODIMENT

Figure 1:
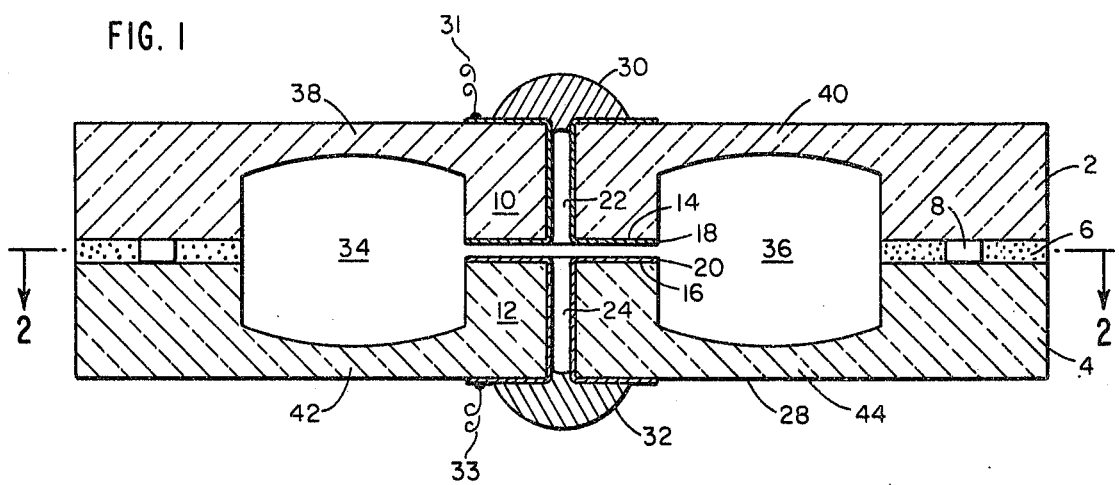
FIG. 1 is an elevation view in cross-section of an embodiment of the present invention.

Referring now to FIG. 1, two contoured ceramic sections 2 and 4 are shown in cross-section. These sections are joined together by means such as fused glass frit 6. Spacers 8 serve to provide the desired spacing between elements 2 and 4.

The dielectric elements have central portions 10 and 12 with faces 14 and 16 respectively. Conducting films 18 and 20 are applied to faces 14 and 16 respectively. These opposed conducting films serve to provide the two plates of a capacitor. The films 18 and 20 extend through holes 22 and 24 to the outer surfaces 26 and 28 of the elements 2 and 4. Solder or other appropriate sealing material 30 and 32 serves to close the holes and isolate the interior space formed by the two elements 2 and 4 from external pressure. Interior relatively large volumes 34 and 36 are formed by the reduced sections 38, 40 and 42, 44 respectively in elements 2 and 4.

If the transducer is to be used to measure absolute pressure, the interior portion can be evacuated and the material 6 can be glass frits fused in a vacuum oven. In this case the seals 26 and 32 must be of high temperature material such as silver solder. Alternatively the fusing of the perimeter and seals 30 and 32 may be accomplished sequentially. Increases in external pressure will cause conductive films 18 and 20 on surfaces 14 and 16 to approach each other more closely due to the deflection of the reduced cross-sections 38, 40, 42 and 44. The reduction in the spacing between the conducting films will result in an increase in the capacitance value which may be sensed by conventional circuitry utilizing external leads 31 and 33. Since the deflection takes place almost solely in the regions of reduced thickness rather than in the central regions 10 and 12, the conducting films 18 and 20 remain in plane parallel relationship as the spacing varies. Thus, additional non-linear variations in capacitance and hysteresis are not introduced through changes in the surface configuration due to bending of the material. Additionally, any distortion with changes in temperature which might be introduced by different expansion coefficients of the conductive films or solder and the dielectric material is substantially eliminated.

The increased volumes 34 and 36 provided by the reduced dielectric element cross-sections provide an increased volume which tends to minimize the effect of any tiny leaks in the seal between the elements or outgassing from the transducer materials.

Since the deflection occurs within the reduced cross-section, there is little stress applied to the dielectric elements at the point where they join the fusing material 6. Typically the unreduced sections may be one hundred times as rigid as the reduced sections. Therefore, the joint between the two dielectric elements subject to relatively little stress introduced by the deflection of the dielectric elements with changes in applied pressure, nor is deflection affected by the typically inferior elasticity of cementing or sealing materials used at the perimeter or center feedthrough. Furthermore, the relatively low yielding stress of the cementing material will not be a limiting factor as would be the case if uniform thickness elements were used. While it is preferred to shape the reduced sections as shown at 38, 40, 42 and 44 so that the stress applied is relatively uniform in a radial direction and does not have peaks at either end of the reduced element, the reduced sections may satisfactorily be made of uniform cross-section for ease in manufacture. While such cross-section will result in slight stress concentrations at the perimeter of the reduced sections, the stress under normal operating conditions will still be within allowable limits for ceramic materials such as alumina.

Figure 1A:
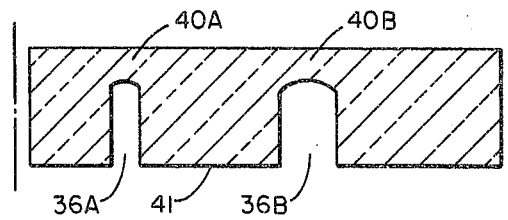
FIG. 1A is an elevation view in cross-section showing a modification of the embodiment of FIG. 1.

Referring now to FIG. 1A, a section of an elevation view in cross-section is shown illustrating a modified embodiment of the apparatus of FIG. 1. The region 36 bounded in part by the area of reduced cross-section 40 has been replaced by two regions 36A and 36B adjoining areas of reduced cross-section 40A and 40B. A region 41 of full cross-sectional thickness extends between the annular regions 36A and 36B. In the embodiment of FIG. 1A the regions of reduced cross-section 40A and 40B provide deflection regions facilitating the deflection of the transducer upon the application of pressure variations. While the regions of reduced cross-section 40A and 40B may be bounded by perfectly flat surfaces, in the embodiment shown the regions are bounded by a surface curved so as to minimize stress concentrations in the material. The deflection occurs in the region 41 which acts like a disc free-supported at its periphery bounded by region 40B. The reduced section 40B reduces the bending moment transmitted to the rim and to the cementing material. The reduced section 40A serves to prevent the transmission of bending moment to the central disc and thus reduces its distortion. If, for example, the dielectric elements are being fabricated from materials such as quartz which must be machined, the embodiment of FIG. 1A offers the advantage of reducing the amount of material which must be removed by machining to form the desired element. On the other hand it does not provide the full extent of the enlarged volume 36 to minimize any possible error introduced by leakage or outgassing of the materials from which the device is fabricated.

While the provision of two regions 36A and 36B as shown in FIG. 1A permits the central section to remain plane and undistorted under conditions of deflection, for some applications the cost saving associated with providing only one region, for example 36B, may outweigh the desirability of maintaining the central section undeformed. When a single relatively narrow region of reduced cross-section is provided, it will provide a hinging function. The remainder of the central section will deform upon the application of pressure. The region of reduced cross-section 36B will serve to substantially isolate the perimeter and joint between the two dielectric elements from the application of torque and avoid the application of unnecessary forces to the joint. In such an embodiment the associated circuitry or use of the transducer will have to take into account the fact that as the central portion deflects, it becomes curved and the curvature affects capacitance variation.

Figure 2:
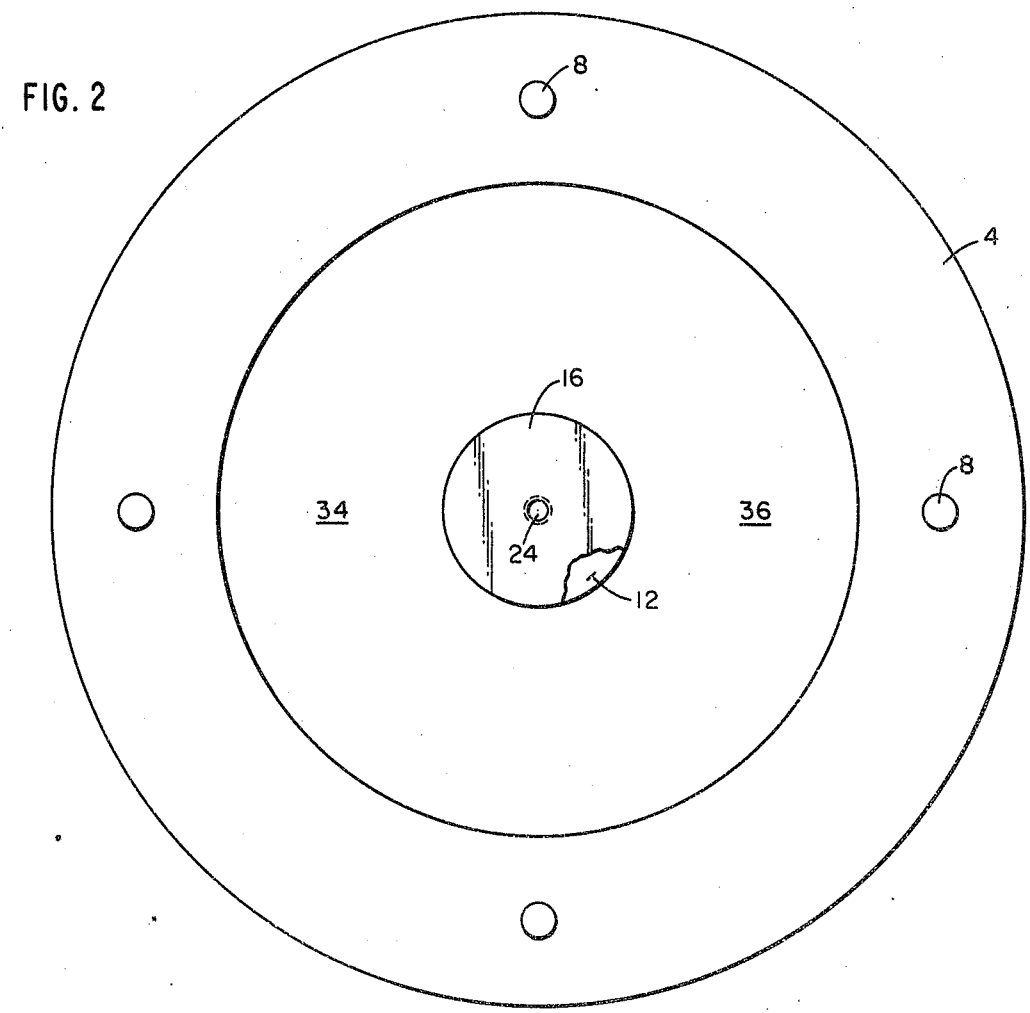
FIG. 2 is a plan view of the embodiment of FIG. 1.

FIG. 2 is a plan view in cross-section. It shows the spacing of the spacers 8 around the perimeter and indicates the fact that the enlarged volumes 34 and 36 are two cross-sections of a continuous circular volume.

Figure 3:
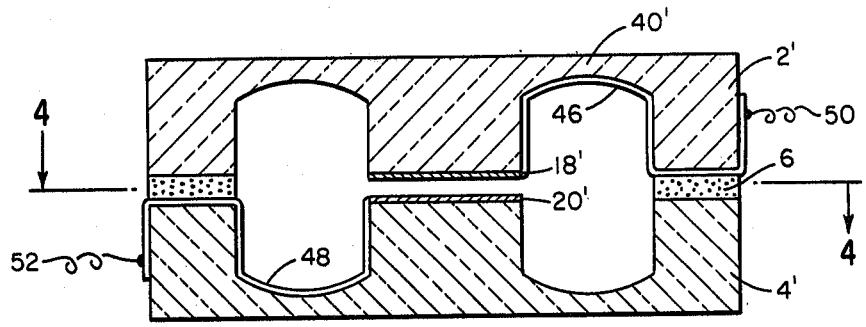
FIG. 3 is an elevation view in cross-section of an embodiment with different means for electrical connections to the capacitor.

Referring now to FIG. 3 another embodiment of the present invention is shown. The structure of the two dielectric elements 2' and 4' is substantially identical except that the openings 22 and 24 are not provided. Instead conductive paths 46 and 48 are provided on elements 2' and 4', respectively. Leads 50 and 52 are affixed to the conductive paths 46 and 48 on the exterior of the transducer. The conductive paths 46 and 48 may be deposited integrally with and at the same time as the conducting surfaces 18' and 20'. When the two elements 2 and 4 are sealed together with, for example, glass frits 6, the conductive paths 46 and 48 do not interfere with the sealing action and the fused glass provides a complete seal around the entire perimeter.

Figure 3A:
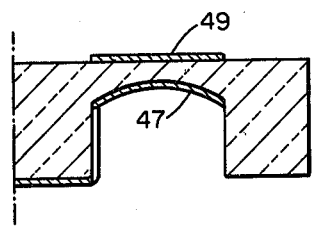
FIG. 3A is an elevation view in cross-section showing a portion of the embodiment of FIG. 3 with capacitive means for connecting to the capacitor of the transducer.

FIG. 3A shows a section of an elevation view in cross-section illustrating a modification to the embodiment of FIG. 3. In this modification the electrical coupling to the capacitor sensing the applied pressure is provided by a coupling capacitor comprising conducting films 47 and 49. The capacitor is formed of a conducting film and the interior portion 47 may be fabricated at the same time the conducting film for the pressure sensing capacitor is being deposited. The external capacitor plate 49 may be a similar deposited film or any affixed conducting film or plate. The reduced cross-section serves to give reasonable capacitance values for coupling purposes. While effective sealing can be obtained with the feedthrough structure of FIG. 3, in some applications it may be desired to have no direct electrical feedthrough whatever, and this embodiment provides an entire enclosing cross-section formed from inert materials.

Figure 4:
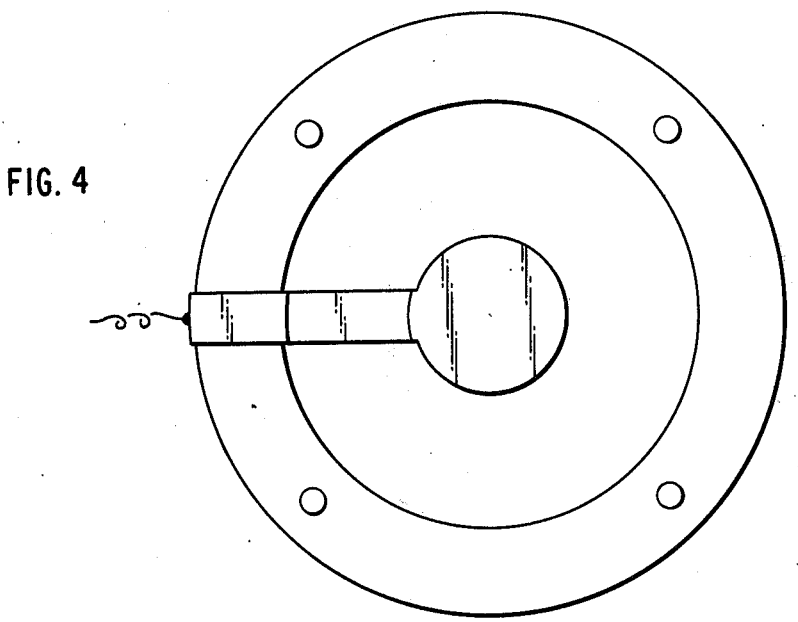
FIG. 4 is a plan view in cross-section of the embodiment of FIG. 3.

FIG. 4 shows the transducer of FIG. 3 in plan cross-section, illustrating the location of spacers 8 for the assembly process and conductive lead feedthrough.

Figure 5:
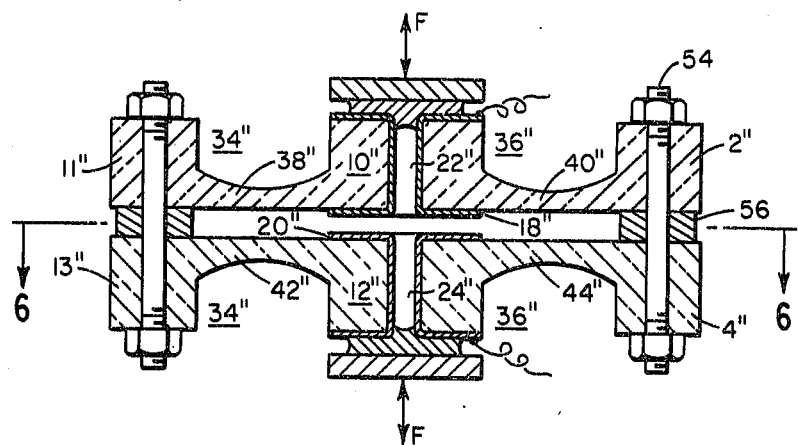
FIG. 5 is an elevation view in cross-section of an embodiment suitable for measurement of an applied force.

Referring now to FIG. 5, an embodiment suitable for a force measuring transducer is shown. In the embodiment shown the forces are indicated as being applied at the positions and in the directions of the arrows F. It will be apparent, of course, that a single force could be applied in either direction at either position and the other side of the transducer restrained by, for example, a suitable base. In the configuration of FIG. 5, the reduced cross-sectional regions 38'', 40'', 42'' and 44'' are provided to provide deflection regions corresponding to those provided in FIG. 1. However, in the structure of FIG. 5, since the apparatus is to be utilized for measuring forces it can be open to ambient pressure both internally and externally. Therefore, the regions 36'', 36''', 34'' and 34''' corresponding generally to regions 34 and 36 of FIG. 1 can be the external side of the element rather than forming an internal volume. The reduced radial cross-section with its uniform radial stress configuration is still desirable, but fabrication and assembly is simplified if the facing surfaces of elements 2'' and 4'' are plane surfaces. In the embodiment shown the leads from conducting surfaces 18'' and 20'' are brought out through passages 22'' and 24''. However, they could of course be brought out through conducting paths on the facing surfaces of elements 2'' and 4'' in a manner similar to that shown in the structure of FIG. 3.

Figure 6:
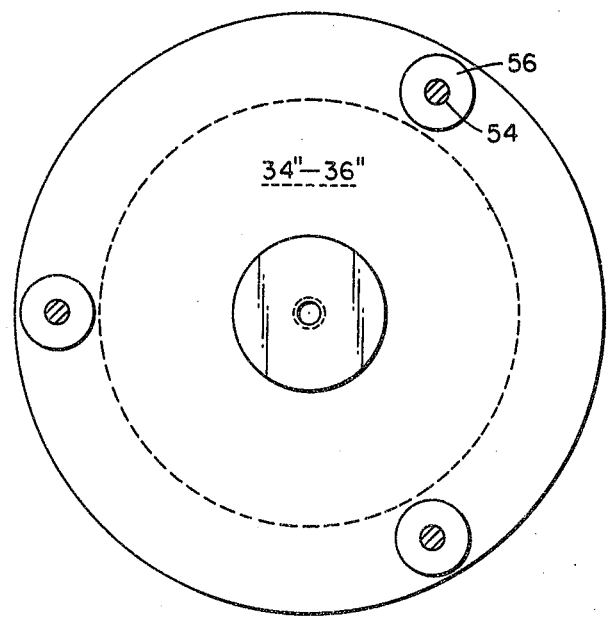
FIG. 6 is a plan view of the embodiment of FIG. 5.

As with the earlier configurations, the thick central sections 10'' and 12'' serve to minimize non-linearity and hysteresis effects and the thicker regions 11'' and 13'' serve to avoid the application of stresses to the joint and thus also to minimize hysteresis. Since a pressure-tight structure is not required, the elements 2'' and 4'' may be simply bolted together with bolts 54 and spacer 56, as shown in FIGS. 5 and 6. FIG. 6 is a plan view of the structure of FIG. 5 illustrating the perimeter mounting and annular nature of the reduced section.

Figure 7:
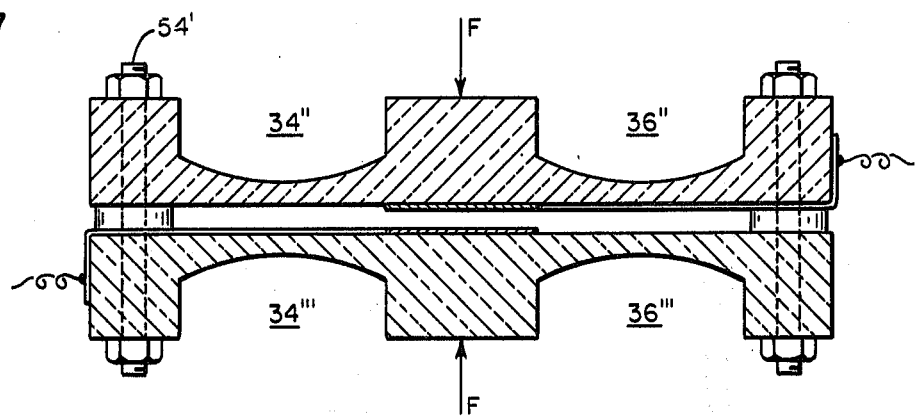
FIG. 7 is an elevation view in cross-section of another embodiment suitable for sensing applied forces.
Figure 8:
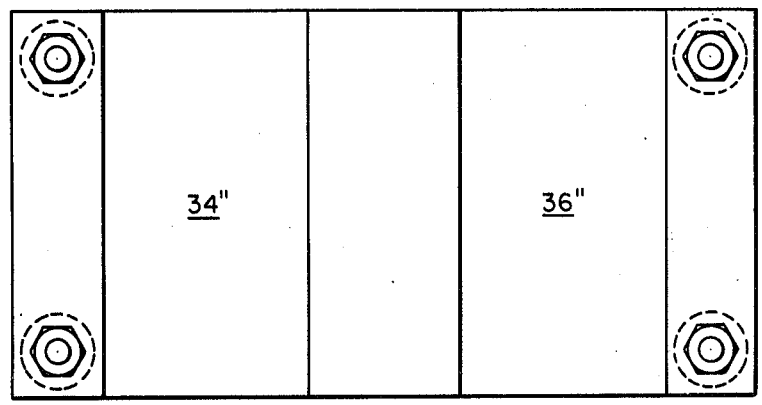
FIG. 8 is a plan view of the embodiment of FIG. 7.

When materials such as alumina are used for the dielectric elements, these may be molded with high precision in almost any configuration. However when a material such as quartz is utilized, the final configuration will normally need to be machined, for example by grinding. For a pressure sensing transducer such as that shown in FIGS. 1 and 3, such machining may be more easily accomplished with the circular structures there shown. However with a force sensing transducer of the sort shown in FIG. 5, fabrication from material such as quartz may be simplified if the structure is made rectangular rather than circular in form. For such a structure, shown in elevation cross-section in FIG. 7, the cross-section in this view may be identical to that shown in FIG. 5, except that the view of the mounting bolts 54' is different. The application of force, and the connection of leads, may be accomplished by techniques substantially identical with those previously described for the structure of FIG. 5. However, as shown in the plan view of FIG. 8, the reduced regions 34'', 34''' and 36'', 36''' are not of the annular form shown in FIG. 6. Thus, they may be formed with linear movement of conventional grinding equipment.

Figure 9:
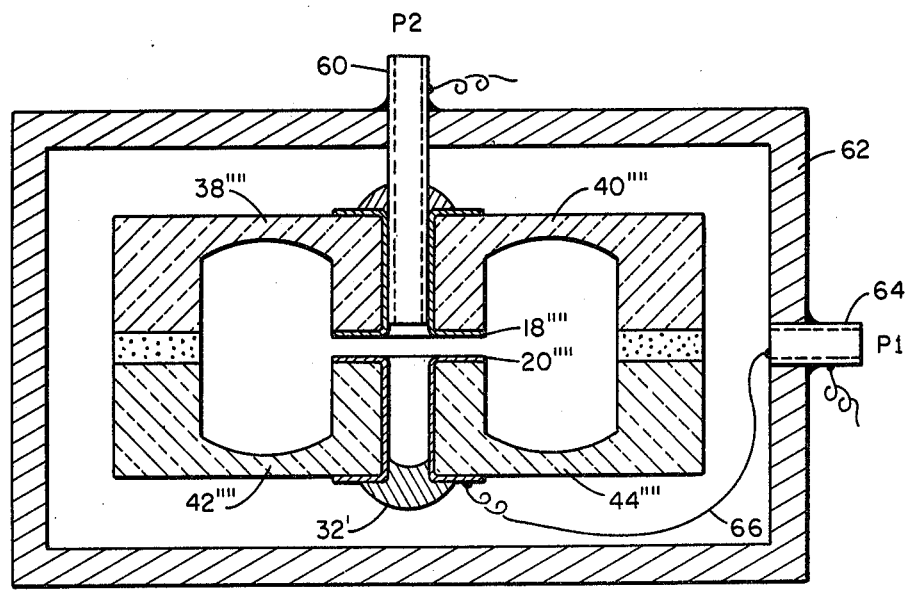
FIG. 9 is an elevation view in cross-section of an embodiment suitable for measuring differential pressures.

Referring now to FIG. 9, an embodiment suitable for sensing differential pressures is shown in elevation cross-section. The transducer is identical to that shown in FIG. 1, except that provision has been made to admit one pressure through the opening 22''' and apply the other pressure to the outer surface of the sensing transducer. A pressure inlet tube or pipe 60 extends into the opening 22'''. In the embodiment shown this tube or pipe also serves to provide physical support for the sensing transducer with respect to the enclosing housing 62. Alternatively, posts or other means could be used to support the perimeter of the sensing transducer within the housing 62. Pressure is admitted to housing 62 through tube or pipe 64. If the tubes 60 and 64 are fabricated of conducting materials and housing 62 is non-conducting or insulated from 60 and 64, they may also serve as electrical leads if an electrical connection is made from the conducting sealing portion 32' to the tube 64, for example as shown by wire 66. Alternatively, separate leads could be brought out through pressure-tight feedthrough connections in the wall of housing 62.

If the pressure applied through tube 64 to the volume 68 is greater than the pressure applied through tube 60, deflection will occur in reduced regions 38'''', 40'''', 42'''' and 44'''' to cause the conducting surfaces 18'''' and 20'''' to come closer together. This reduced spacing results in an increased capacitance which may be sensed by conventional circuitry.

While certain preferred embodiments have been described above, it will be apparent to those skilled in the art that modifications may be made for specific applications. For example, for the most critical electrical performance applications it may be desirable to lap the facing surfaces upon which the conducting films are deposited to insure absolute flatness. While the use of glass frits for fusing the two elements together will provide structures adequate to withstand most environments, cost or performance characteristics may make other sealing arrangements desirable for specific applications. Among other possibilities are the use of solder, bolting with appropriate resilient sealing material between the outer perimeters of the elements, and the use of cement such as epoxy cement. The particular materials chosen may limit the temperature ranges under which the apparatus may be fabricated or operated, and determine the severity of problems such as outgassing which, for example, would be severe with wet epoxy. In general the suitable dielectrics such as alumina or quartz have excellent elastic properties. Alumina may be molded or fired rather precisely to desired configurations. On the other hand, while quartz must be machined, it has superior elasticity and resistance to corrosive environments.

Specific electrical circuitry for sensing and utilizing the variations in capacitance has not been shown. However, they may be conventional measurement systems, such as that described in Lee and Li U.S. Pat. No. 3,518,536 or in copending application Ser. No. 695,026 U.S. Pat. No. 4,054,833 of Dennis K. Briefer. The particular circuit performance characteristics desired will depend upon the use which is to be made of the data. Such use may vary widely. A force or pressure measuring instrument may be desired, or the transducer may be part of an operating system wherein the change in capacitance is used to control a parameter which will affect system performance and the pressure being measured.

Having thus described my invention, I claim:

1. A pressure sensing transducer comprising two dielectric elements, each of said elements having a central planar portion with a conducting surface, said conducting surfaces serving to form a capacitor, at least one of said central portions being surrounded by an area wherein the thickness of the dielectric is reduced, each of said dielectric elements having a planar peripheral region in the same plane as its central planar portion, means free of clamping force and torque holding said peripheral regions in fixed spaced parallel relationship to form a single interior interconnected volume, whereby a difference in pressure between said interior volume and pressure exterior to at least one of said elements causes deflection of an element in the region of reduced thickness, the deflection causing a change in the spacing between said conducting surfaces and the capacitance of the capacitor related to said pressure difference, the bending deflection in said area of reduced cross section being substantially greater than that in a corresponding area of the central portion so that both the bending moment applied to the peripheral regions and the distortion of the central portions are reduced.

2. A transducer according to claim 1 wherein said area of reduced thickness serves to provide an increased internal volume without a corresponding increase in the spacing of the conducting capacitor surfaces.

3. A transducer according to claim 1 wherein said area of reduced thickness is of varying thickness in radial directions from the center to provide substantially uniform stress distribution in the radial direction.

4. Apparatus according to claim 1 wherein said transducer elements are fabricated of quartz.

5. Apparatus according to claim 1 wherein said transducer elements are fabricated of molded glass.

6. Apparatus according to claim 1 wherein said transducer elements are fabricated of molded ceramic.

7. A pressure transducer according to claim 1 having means to apply force to at least one of said central portions to provide a force sensing transducer.

8. Apparatus according to claim 1 wherein an electrically conducting lead is provided through said central portion from said conducting surface to an exterior surface.

9. A transducer according to claim 1 wherein said conducting surface is provided with an electrically conducting lead passing through the region in which said elements are joined together.

10. Apparatus according to claim 1 wherein the means for holding said elements together is fused glass.

11. A pressure sensing transducer comprising two dielectric elements, each of said elements having a central planar portion with a conducting surface, said conducting surfaces serving to form a capacitor, at least one of said central portions being surrounded by an area wherein the thickness of the dielectric is reduced, each of said dielectric elements having a planar peripheral region in the same plane as its central planar portion, means free of clamping force and torque holding said peripheral regions in fixed spaced parallel relationship to form a single interior interconnected volume, a first conducting film applied to a portion of the interior surface of the area of reduced thickness of one of said dielectric elements, said first conducting film being electrically connected with the conducting surface of said dielectric element, a second conducting film applied to a corresponding area on the outside of a portion of the area of reduced thickness of said dielectric element, said first and second conducting films with the dielectric element therebetween serving to provide a coupling capacitor for indicating the capacitance of the transducer capacitor in the absence of any lead passing through either dielectric element or through the region in which said dielectric elements are joined, whereby a difference in pressure between said interior volume and pressure exterior to at least one of said elements causes deflection of an element in the region of reduced thickness, the deflection causing a change in the spacing between said conducting surfaces and the capacitance of the capacitor related to said pressure difference, said central portions being of sufficient cross-section to be substantially rigid and undistorted by the application of pressure whereby only the spacing between the conducting surfaces is affected by applied operating pressure and hysteresis effects and non-linearity are minimized.

* * * * *